United States Patent
Kupratis (10) Patent No.: US 12,312,998 B1
(45) Date of Patent: May 27, 2025

(54) ACTUATABLE AIRFLOW SPLITTER FOR AN AIRCRAFT POWERPLANT

(71) Applicant: RTX Corporation, Farmington, CT (US)

(72) Inventor: Daniel B. Kupratis, Wallingford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/660,766

(22) Filed: May 10, 2024

(51) Int. Cl.
  *F02C 7/04* (2006.01)
  *F02C 7/042* (2006.01)

(52) U.S. Cl.
  CPC ........ *F02C 7/042* (2013.01); *F05D 2220/323* (2013.01); *F05D 2260/56* (2013.01); *F05D 2300/603* (2013.01)

(58) Field of Classification Search
  CPC .... F02C 7/04; F02C 7/042; F02C 9/16; F02C 9/20; F05D 2220/323; F05D 2260/56; F05D 2300/603; F05D 2250/90; F01D 9/06
  See application file for complete search history.

(56) References Cited

U.S. PATENT DOCUMENTS

| | | | |
|---|---|---|---|
| 2,763,448 A * | 9/1956 | Davie, Jr. | ................. B64C 3/48 244/214 |
| 3,611,724 A | 10/1971 | Kutney | |
| 4,155,221 A | 5/1979 | Dhoore | |
| 8,286,654 B2 | 10/2012 | Prasad | |
| 10,738,699 B2 | 8/2020 | Burnside | |
| 11,255,295 B2 | 2/2022 | Pouyau | |
| 11,448,127 B2 | 9/2022 | Nestico | |
| 11,852,099 B1 | 12/2023 | Pachidis | |
| 2017/0268374 A1* | 9/2017 | Sellinger | ................. F02C 7/042 |

FOREIGN PATENT DOCUMENTS

| | | |
|---|---|---|
| GB | 800380 A | 8/1958 |
| JP | S58107842 A | 6/1983 |
| WO | 2002036951 A1 | 5/2002 |

* cited by examiner

*Primary Examiner* — Steven M Sutherland
(74) *Attorney, Agent, or Firm* — Getz Balich LLC (57) ABSTRACT

An assembly is provided for an aircraft propulsion system. This assembly includes an inner wall structure, an outer wall structure, a splitter and an actuation system. The inner wall structure extends axially along a first axis to an inner wall upstream end. The outer wall structure extends axially along the first axis to an outer wall upstream end. The splitter extends axially along the first axis to a leading edge. An inner section of the splitter is connected to the inner wall structure at the inner wall upstream end. An outer section of the splitter is connected to the outer wall structure at the outer wall upstream end and meets the inner section of the splitter at the leading edge. The actuation system is mechanically coupled to the splitter and is configured to move the leading edge radially relative to the first axis.

18 Claims, 5 Drawing Sheets

FIG. 4

ACTUATABLE AIRFLOW SPLITTER FOR AN AIRCRAFT POWERPLANT

BACKGROUND OF THE DISCLOSURE

1. Technical Field

This disclosure relates generally to an aircraft powerplant and, more particularly, to flow splitting for the aircraft powerplant.

2. Background Information

A turbofan engine for an aircraft propulsion system includes a splitter for splitting incoming air into a core flowpath and a bypass flowpath. Various turbofan engine arrangements are known in the art for tailoring the splitting of the incoming air into the core flowpath and the bypass flowpath. While these known turbofan engine arrangements have various benefits, there is still room in the art for improvement.

SUMMARY OF THE DISCLOSURE

According to an aspect of the present disclosure, an assembly is provided for an aircraft propulsion system. This assembly includes an inner wall structure, an outer wall structure, a splitter and an actuation system. The inner wall structure extends axially along a first axis to an inner wall upstream end. The inner wall structure extends circumferentially about the first axis. The inner wall structure forms an outer peripheral boundary of an inner flowpath. The outer wall structure extends axially along the first axis to an outer wall upstream end. The outer wall structure extends circumferentially about the inner wall structure and the first axis. The outer wall structure forms an inner peripheral boundary of an outer flowpath. The splitter extends axially along the first axis to a leading edge. An inner section of the splitter is connected to the inner wall structure at the inner wall upstream end. An outer section of the splitter is connected to the outer wall structure at the outer wall upstream end and meets the inner section of the splitter at the leading edge. The splitter is configured from or otherwise includes a deformable material. The actuation system is mechanically coupled to the splitter and is configured to move the leading edge radially relative to the first axis.

According to another aspect of the present disclosure, another assembly is provided for an aircraft propulsion system. This assembly includes an inner wall structure, an outer wall structure, a splitter and an actuation system. The inner wall structure extends axially along a first axis to an inner wall upstream end. The inner wall structure extends circumferentially around the first axis. The inner wall structure forms an outer peripheral boundary of an inner flowpath. The outer wall structure extends axially along the first axis to an outer wall upstream end. The outer wall structure extends circumferentially around the inner wall structure. The outer wall structure forms an inner peripheral boundary of an outer flowpath. The splitter is connected to the inner wall structure at the inner wall upstream end. The splitter is connected to the outer wall structure at the outer wall upstream end. The splitter projects axially along the axis to a leading edge. The splitter is configured from or otherwise includes a deformable material. The actuation system includes a rocker arm operatively coupled to the splitter. The actuation system is configured to move the leading edge radially relative to the first axis by pivoting the rocker arm about a rocker axis.

According to still another aspect of the present disclosure, another assembly is provided for an aircraft propulsion system. This assembly includes a bladed rotor, an inner flowpath, an outer flowpath, a splitter and an actuation system. The bladed rotor is rotatable about a first axis. The inner flowpath includes an inner flowpath inlet downstream of the bladed rotor. The outer flowpath includes an outer flowpath inlet downstream of the bladed rotor. The outer flowpath inlet is radially outboard of the inner flowpath inlet. The splitter is disposed radially between and partially forms the inner flowpath inlet and the outer flowpath inlet. The splitter is configured from or otherwise includes a polymer material. The actuation system is mechanically coupled to the splitter and is configured to change a configuration of the splitter.

The deformable material may form the inner section of the splitter and the outer section of the splitter.

The deformable material may be or otherwise include a polymer matrix.

The deformable material may also include fiber reinforcement embedded within the polymer matrix.

The actuation system may include a rocker arm. The rocker arm may include a base, a first arm and a second arm. The base may be between the first arm and the second arm. The base may be configured to pivot about a rocker axis. The first arm may project longitudinally out from the base towards the leading edge. The first arm may be operatively coupled to the splitter.

The splitter may include a receptacle at a backside of the leading edge. The first arm may project longitudinally into the receptacle.

The first arm may project longitudinally out from the base towards the leading edge to a distal end of the first arm. The first arm may engage the splitter at the distal end of the first arm.

The rocker axis may be perpendicular to and radially offset from the first axis.

The rocker axis may be non-coincident with and may be angularly offset from the first axis.

The actuation system may also include a first cam and a second cam. The first cam may be engaged with the first arm. The first cam may be configured to pivot the rocker arm a first direction about the rocker axis. The second cam may be engaged with the second arm. The second cam may be configured to pivot the rocker arm a second direction about the rocker axis.

Pivoting of the rocker arm in the first direction about the rocker axis may move the leading edge radially away from the first axis. Pivoting of the rocker arm in the second direction about the rocker axis may move the leading edge radially towards the first axis.

The actuation system may also include a nut and a leadscrew. The nut may be threaded onto the leadscrew and may be operatively coupled to the first cam and the second cam.

The assembly may also include a variable vane extending across the inner flowpath. The variable vane may be configured to pivot about a vane axis. The actuation system may be mechanically coupled to the variable vane and may be configured to pivot the variable vane about the vane axis.

Movement of the leading edge radially relative to the first axis may be mechanically linked with pivoting of the variable vane about the vane axis.

Movement of the leading edge radially relative to the first axis may be timed with pivoting of the variable vane about the vane axis.

The assembly may also include a bladed rotor rotatable about the first axis. The splitter may be axially next to and downstream of bladed rotor.

The bladed rotor may be configured as or otherwise include a fan rotor. The inner flowpath may be configured as or otherwise include a core flowpath. The outer flowpath may be configured as or otherwise include a bypass flowpath.

The assembly may also include an engine core configured to drive rotation of the bladed rotor about the first axis. The engine core may include a compressor section, a combustor section and a turbine section. The inner flowpath may extend away from the splitter and through the compressor section, the combustor section and the turbine section. The outer flowpath may extend away from the splitter and may be disposed outside of the engine core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
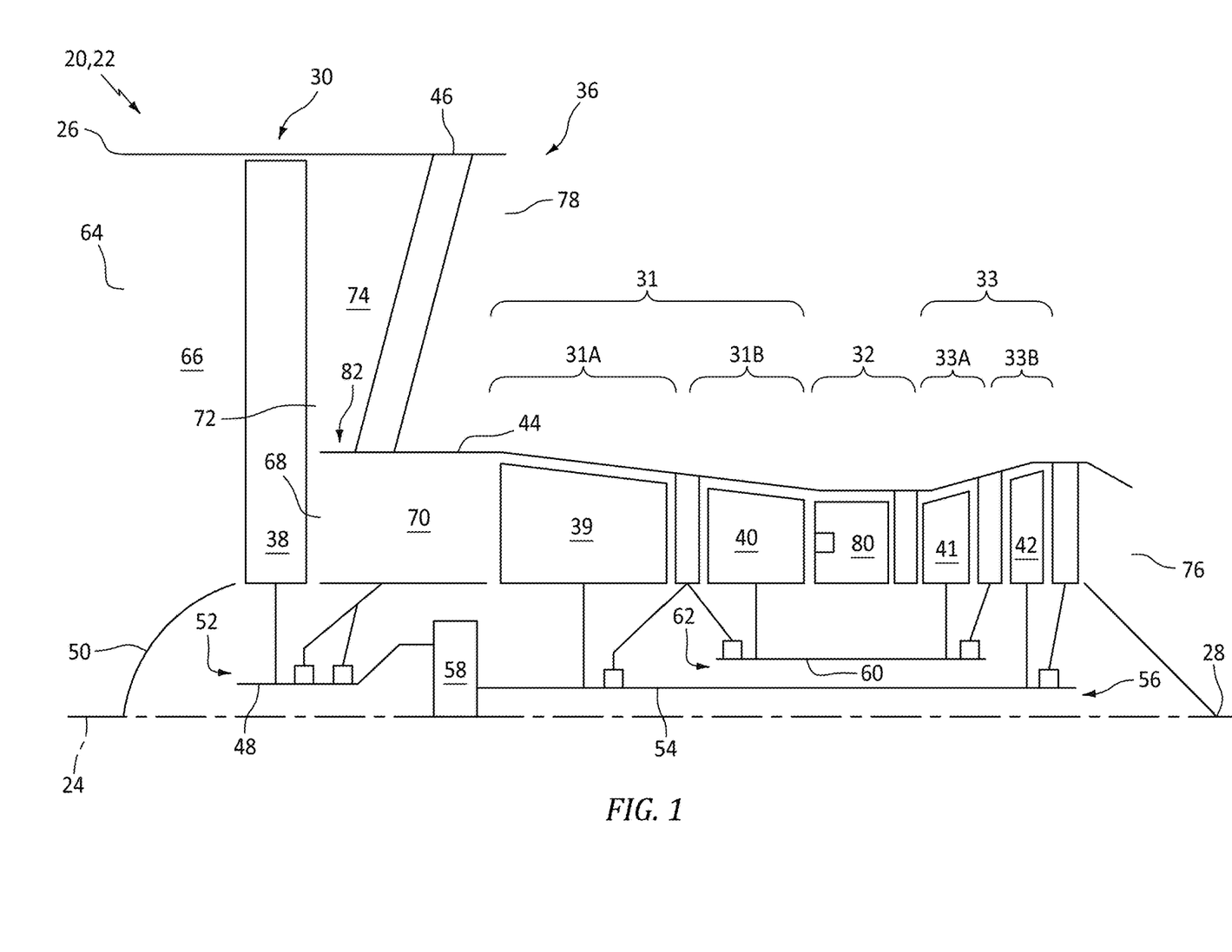
FIG. 1 is a partial schematic illustration of a powerplant for an aircraft propulsion system.

FIG. 1 illustrates a powerplant 20 of a propulsion system for an aircraft. The aircraft may be an airplane, a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the aircraft powerplant 20 is described below as a gas turbine engine 22 such as a turbofan engine. The present disclosure, however, is not limited to such exemplary aircraft propulsion system and/or aircraft powerplant configurations.

The turbine engine 22 extends axially along an axis 24 between a forward, upstream end 26 of the turbine engine 22 and an aft, downstream end 28 of the turbine engine 22. Briefly, the axis 24 may be a centerline axis of the turbine engine 22 and/or one or more of its members. The axis 24 may also or alternatively be a rotational axis for one or more members of the turbine engine 22. The turbine engine 22 of FIG. 1 includes a propulsor section 30 (e.g., a fan section), a compressor section 31, a combustor section 32 and a turbine section 33. The compressor section 31 includes a low pressure compressor (LPC) section 31A and a high pressure compressor (HPC) section 31B. The turbine section 33 includes a high pressure turbine (HPT) section 33A and a low pressure turbine (LPT) section 33B.

The engine sections 30-33B may be arranged sequentially along the axis 24 within a stationary engine housing 36. The propulsor section 30 includes a bladed propulsor rotor 38; e.g., a fan rotor. The LPC section 31A includes a bladed low pressure compressor (LPC) rotor 39. The HPC section 31B includes a bladed high pressure compressor (HPC) rotor 40. The HPT section 33A includes a bladed high pressure turbine (HPT) rotor 41. The LPT section 33B includes a bladed low pressure turbine (LPT) rotor 42. These engine rotors 38-42 are housed within the engine housing 36. The engine housing 36 of FIG. 1, for example, includes an inner housing structure 44 (e.g., a core case structure) and an outer housing structure 46 (e.g., a propulsor case structure). The inner housing structure 44 may house one or more of the engine sections 31A-33B and their engine rotors 39-42. The outer housing structure 46 may house at least the propulsor section 30 and its propulsor rotor 38.

The propulsor rotor 38 of FIG. 1 is connected to and rotatable with a propulsor shaft 48; e.g., a fan shaft. The propulsor rotor 38 of FIG. 1 is also connected to and rotatable with a nose cone 50. At least (or only) the propulsor rotor 38, the propulsor shaft 48 and the nose cone 50 collectively form a propulsor rotating assembly 52. This propulsor rotating assembly 52 of FIG. 1 and its members 38, 48 and 50 are rotatable about the axis 24. Here, the nose cone 50 may be referred to as a spinner since the nose cone 50 of FIG. 1 is rotatable with the propulsor rotating assembly 52 and its propulsor rotor 38. It is contemplated, however, the nose cone 50 may alternatively be a stationary member of the turbine engine 22 where, for example, the nose cone 50 is fixed to (or part of) the inner housing structure 44 or another stationary structure of the turbine engine 22.

The LPC rotor 39 is coupled to and rotatable with the LPT rotor 42. The LPC rotor 39 of FIG. 1, for example, is connected to the LPT rotor 42 through a low speed shaft 54. At least (or only) the LPC rotor 39, the LPT rotor 42 and the low speed shaft 54 collectively form a low speed rotating assembly 56; e.g., a low speed spool of the engine core. This low speed rotating assembly 56 of FIG. 1 and its members 39, 42 and 54 are rotatable about the axis 24; however, it is contemplated the low speed rotating assembly 56 may alternatively be rotatable about another axis radially and/or angularly offset from the axis 24. Referring again to FIG. 1, the low speed rotating assembly 56 is also coupled to the propulsor rotating assembly 52. The low speed rotating assembly 56 of FIG. 1, for example, is connected to the propulsor rotating assembly 52 through a geartrain 58; e.g., an epicyclic gear system, a transmission, etc. With this arrangement, the low speed rotating assembly 56 and its LPT rotor 42 may rotate at a different (e.g., faster) rotational velocity than the propulsor rotating assembly 52 and its propulsor rotor 38. However, it is contemplated the propulsor rotor 38 may alternatively be coupled to the low speed rotating assembly 56 and its LPT rotor 42 without the geartrain 58 such that the LPT rotor 42 may directly drive rotation of the propulsor rotor 38 through a shaft (e.g., the low speed shaft 54) or a shaft assembly.

The HPC rotor 40 is coupled to and rotatable with the HPT rotor 41. The HPC rotor 40 of FIG. 1, for example, is connected to the HPT rotor 41 through a high speed shaft 60. At least (or only) the HPC rotor 40, the HPT rotor 41 and the high speed shaft 60 collectively form a high speed rotating assembly 62; e.g., a high speed spool of the engine core. This high speed rotating assembly 62 of FIG. 1 and its members 40, 41 and 60 are rotatable about the axis 24; however, it is contemplated the high speed rotating assembly 62 may alternatively be rotatable about another axis radially and/or angularly offset from the axis 24.

During operation, air enters the turbine engine 22 through an airflow inlet 64. This air is directed from the airflow inlet 64 and propelled by the propulsor rotor 38 through a propulsor flowpath 66 to an inlet 68 into a (e.g., annular) core flowpath 70 and an inlet 72 into a (e.g., annular) bypass flowpath 74. The propulsor flowpath 66 extends through the propulsor section 30. The core flowpath 70 of FIG. 1 extends sequentially through the LPC section 31A, the HPC section 31B, the combustor section 32, the HPT section 33A and the LPT section 33B from the core inlet 68 to a combustion products exhaust 76 out from the core flowpath 70 and the engine core. The air entering the core flowpath 70 from the propulsor flowpath 66 may be referred to as "core air". The bypass flowpath 74 of FIG. 1 extends through a (e.g., annular) bypass duct from the bypass inlet 72 to an airflow exhaust 78 out from the bypass flowpath 74. This bypass flowpath 74 and its bypass duct bypass (e.g., are disposed radially outboard of and extend along) the engine core. The air entering the bypass flowpath 74 from the propulsor flowpath 66 may be referred to as "bypass air".

The core air is compressed by the LPC rotor 39 and the HPC rotor 40 and is directed into a (e.g., annular) combustion chamber 80 of a (e.g., annular) combustor in the combustor section 32. Fuel is injected into the combustion chamber 80 and mixed with the compressed core air to provide a fuel-air mixture. This fuel-air mixture is ignited and combustion products thereof flow through and sequentially drive rotation of the HPT rotor 41 and the LPT rotor 42 about the axis 24. The rotation of the HPT rotor 41 and the LPT rotor 42 respectively drive rotation of the HPC rotor 40 and the LPC rotor 39 about the axis 24 and, thus, compression of the air received from the core inlet 68. The rotation of the LPT rotor 42 also drives rotation of the propulsor rotor 38. The rotation of the propulsor rotor 38 propels the bypass air through and out of the bypass flowpath 74. The propulsion of the bypass air may account for a majority of thrust generated by the turbine engine 22, e.g., more than seventy-five percent (75%) of engine thrust. The turbine engine 22 of the present disclosure, however, is not limited to the foregoing exemplary thrust ratio.

Figure 2:
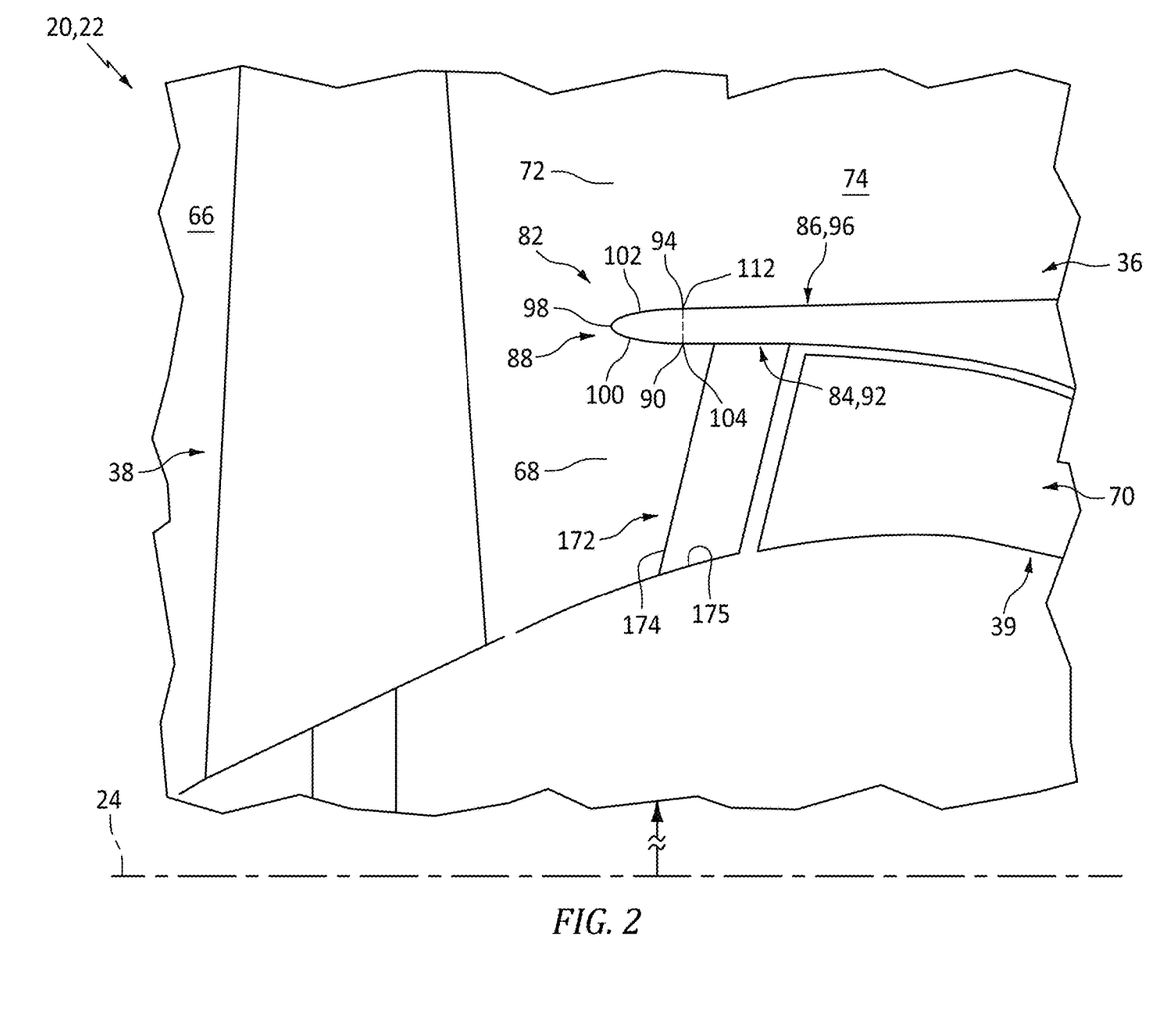
FIG. 2 is a schematic illustration of a portion of the powerplant at an airflow splitter between flowpaths.

Referring to FIG. 2, the engine housing 36 includes an inter-flowpath structure 82 radially between the core flowpath 70 and the bypass flowpath 74 at a downstream end of the propulsor flowpath 66. The inter-flowpath structure 82 includes a radial inner wall structure 84, a radial outer wall structure 86 and an airflow splitter 88.

The inner wall structure 84 extends axially along the axis 24 to a forward, upstream end 90 of the inner wall structure 84. The inner wall structure 84 extends circumferentially about (e.g., completely around) the axis 24 providing the inner wall structure 84 with, for example, a full-hoop geometry; e.g., a tubular geometry. The inner wall structure 84 may form a radial outer flowpath wall 92 for the core flowpath 70. A radial inner side of the inner wall structure 84 of FIG. 2, for example, forms a section of a radial outer peripheral boundary of the core flowpath 70. This section of the outer peripheral boundary of the core flowpath 70 may extend along the core flowpath 70 from the airflow splitter 88 at least to (or near) the LPC rotor 39 and/or along the LPC rotor 39.

The inner wall structure 84 is a rigid member (e.g., a substantially non-deformable member) of the inter-flowpath structure 82. The inner wall structure 84 may be constructed from a relatively stiff material such as metal. The present disclosure, however, is not limited to such an exemplary inner wall structure configuration.

The outer wall structure 86 extends axially along the axis 24 to a forward, upstream end 94 of the outer wall structure 86. The outer wall structure 86 extends circumferentially about (e.g., completely around) the axis 24 providing the outer wall structure 86 with, for example, a full-hoop geometry; e.g., a tubular geometry. The outer wall structure 86 may form a radial inner flowpath wall 96 for the bypass flowpath 74. A radial outer side of the outer wall structure 86 of FIG. 2, for example, forms a section of a radial inner peripheral boundary of the bypass flowpath 74. This section of the inner peripheral boundary of the bypass flowpath 74 may extend along the bypass flowpath 74 from the airflow splitter 88 towards the bypass exhaust 78 (see FIG. 1).

The outer wall structure 86 is another rigid member (e.g., a substantially non-deformable member) of the inter-flowpath structure 82. The outer wall structure 86 may be constructed from a relatively stiff material such as metal. The present disclosure, however, is not limited to such an exemplary outer wall structure configuration.

Figure 3:
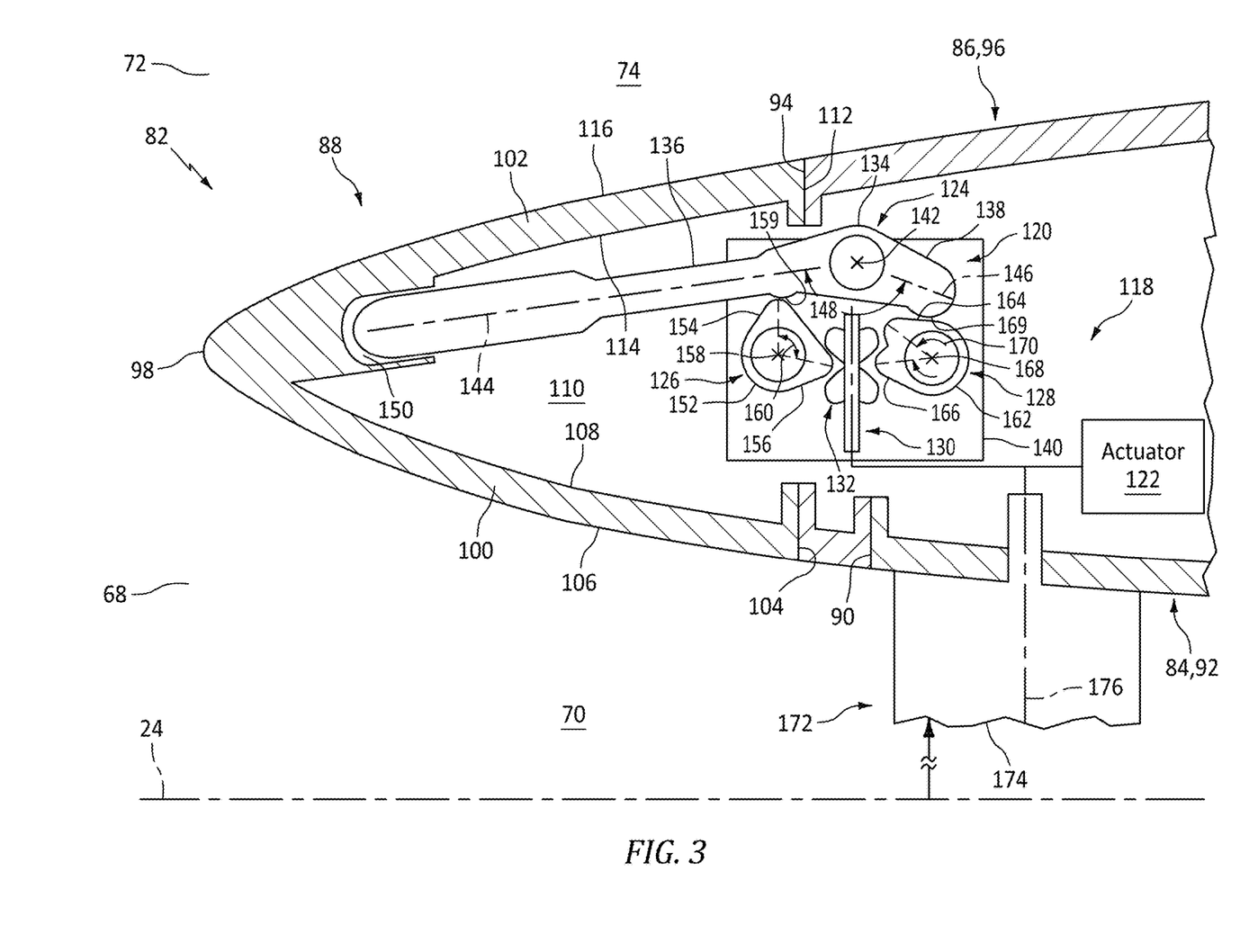
FIG. 3 is a partial sectional illustration of an interflowpath structure at the splitter with its leading edge adjusted in an outer position.
Figure 4:
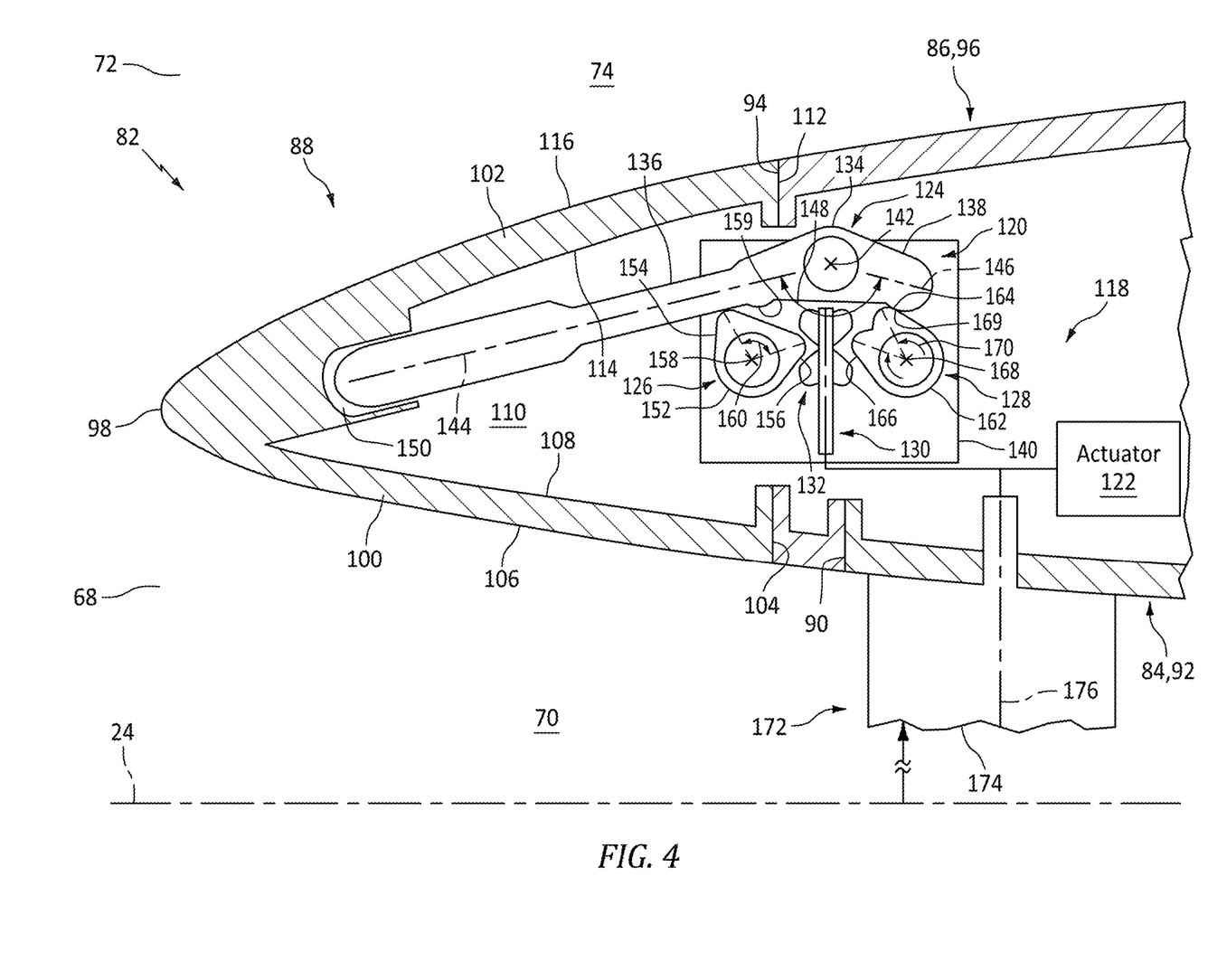
FIG. 4 is a partial sectional illustration of the interflowpath structure at the splitter with its leading edge adjusted in an inner position.

The airflow splitter 88 is a (e.g., annular) wedge-shaped member of the inter-flowpath structure 82 at the downstream end of the propulsor flowpath 66. This airflow splitter 88 provides an intersection between the inner wall structure 84 and the outer wall structure 86. More particularly, the airflow splitter 88 of FIG. 2 provides an intersection between the outer peripheral boundary of the core flowpath 70 and the inner peripheral boundary of the bypass flowpath 74. The airflow splitter 88 is also radially between and partially forms the core inlet 68 and the bypass inlet 72. The airflow splitter 88 of FIG. 2, for example, projects axially along the axis 24 (away from the inner wall structure 84 and the outer wall structure 86) to a forward, upstream leading edge 98 of the inter-flowpath structure 82 and its airflow splitter 88. Referring to FIGS. 3 and 4, the airflow splitter 88 includes a radial inner section 100 and a radial outer section 102.

The splitter inner section 100 extends axially along the axis 24 from an aft, downstream end 104 of the splitter inner section 100 to the leading edge 98, where the splitter inner section 100 meets with the splitter outer section 102. At the inner section downstream end 104, the splitter inner section 100 is attached (e.g., directly or indirectly mechanically fastened) to the inner wall structure 84 at its inner wall upstream end 90. The splitter inner section 100 extends circumferentially about (e.g., completely around) the axis 24 providing the splitter inner section 100 with a full-hoop geometry; e.g., a tubular geometry. The splitter inner section 100 extends radially between a radial inner side 106 of the splitter inner section 100 and a radial outer side 108 of the splitter inner section 100. The inner section inner side 106 is also a radial inner side of the airflow splitter 88. The inner section inner side 106 forms another section of the outer peripheral boundary of the core flowpath 70 as well as the core inlet 68 at the leading edge 98. This section of the outer peripheral boundary of the core flowpath 70 may extend along the core flowpath 70 from (or near) the inner wall upstream end 90 to the leading edge 98. The inner section outer side 108 may form a radial inner peripheral boundary of an internal volume 110 (e.g., cavity, channel, etc.) within the airflow splitter 88.

The splitter outer section 102 extends axially along the axis 24 from an aft, downstream end 112 of the splitter outer section 102 to the leading edge 98, where the splitter outer section 102 meets with the splitter inner section 100. At the outer section downstream end 112, the splitter outer section 102 is attached (e.g., directly or indirectly mechanically fastened) to the outer wall structure 86 at its outer wall upstream end 94. The splitter outer section 102 extends circumferentially about (e.g., completely around) the axis 24 as well as the splitter outer section 102 providing the splitter outer section 102 with a full-hoop geometry; e.g., a tubular geometry. The splitter outer section 102 extends radially between a radial inner side 114 of the splitter outer section 102 and a radial outer side 116 of the splitter outer section 102. The outer section outer side 116 is also a radial outer side of the airflow splitter 88. The outer section outer side 116 forms another section of the inner peripheral boundary of the bypass flowpath 74 as well as the bypass inlet 72 at the leading edge 98. This section of the inner peripheral boundary of the bypass flowpath 74 may extend along the bypass flowpath 74 from (or near) the outer wall upstream end 94 to the leading edge 98. The outer section inner side 114 may form a radial outer peripheral boundary of the internal volume 110.

The airflow splitter 88 and its sections 100 and 102 form a deformable and resilient member of the inter-flowpath structure 82. The airflow splitter 88 and its sections 100 and 102 may be formed as a monolithic body from relatively flexible splitter material; e.g., a non-metal composite material. The airflow splitter 88 and its sections 100 and 102, for example, may be constructed from a polymer matrix and fiber reinforcement embedded within the polymer matrix. The polymer matrix may be an elastomer such as rubber. The fiber reinforcement may include one or more woven or non-woven layers of long-strand, short-strand or chopped fibers; e.g., fiberglass fibers, carbon fibers, aramid fibers (e.g., Kevlar® fibers), or any combination thereof. It is contemplated, however, the airflow splitter 88 and its sections 100 and 102 may alternatively be constructed from the polymer matrix with the fiber reinforcement to a side of the polymer matrix or even without the fiber reinforcement in select embodiments. The present disclosure, however, is not limited to such exemplary airflow splitter constructions or materials.

Figure 5:
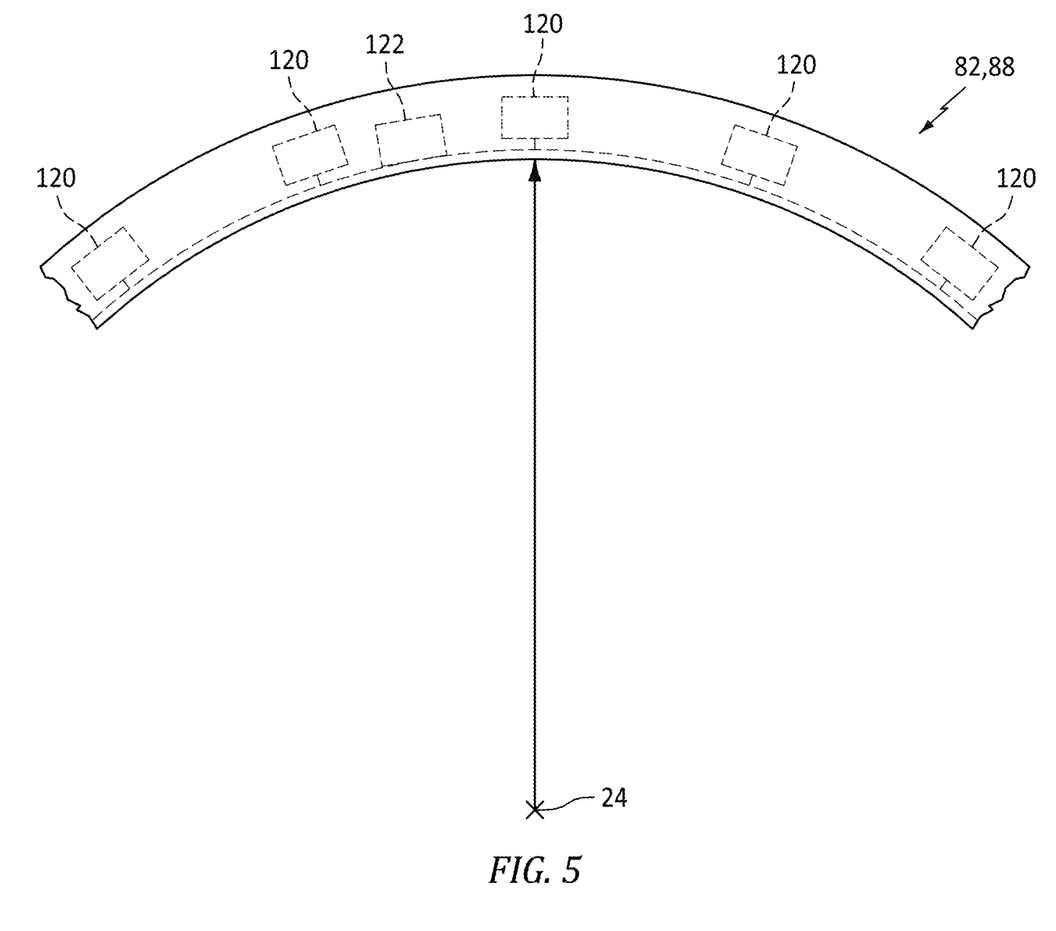
FIG. 5 is a partial schematic illustration of the splitter with multiple actuation assemblies.

The airflow splitter 88 is mechanically coupled to an actuation system 118. This actuation system 118 is configured to selectively change a configuration of the airflow splitter 88. The actuation system 118, for example, is configured to change a sectional geometry of the airflow splitter 88 between a first arrangement (e.g., see FIG. 3) and a second arrangement (e.g., see FIG. 4) or anywhere therebetween when viewed, for example, in a reference plane parallel with (e.g., including) the axis 24. The actuation system 118 may thereby move the leading edge 98 radially relative to the axis 24 between a leading edge (LE) outer position (e.g., see FIG. 3) and a leading edge (LE) inner position (e.g., see FIG. 4). Referring to FIG. 5, the actuation system 118 includes one or more actuation assemblies 120 and an actuator 122. Briefly, the actuator 122 may be an electric motor, a hydraulic actuator, a pneumatic actuator or the like.

The actuation assemblies 120 are arranged and may be equispaced circumferentially about the axis 24 in an annular array; e.g., a circular array. Referring to FIGS. 3 and 4, each of the actuation assemblies 120 includes a rocker arm 124, a first cam 126, a second cam 128, a leadscrew 130 and a leadscrew nut 132.

The rocker arm 124 includes a rocker base 134, a rocker first arm 136 and a rocker second arm 138. The rocker base 134 is between and is connected to the rocker first arm 136 and the rocker second arm 138. More particularly, the rocker first arm 136 and the rocker second arm 138 are arranged to opposing lateral sides of the rocker base 134. The rocker base 134 is pivotally coupled to a stationary assembly mount 140 (schematically shown) and is configured to pivot (e.g., rock back and forth) about a rocker axis 142; e.g., a pivot axis of the rocker arm 124. This rocker axis 142 may be non-coincident with the axis 24 and may also be angularly offset from the axis 24 by a non-zero offset angle. The rocker axis 142 of FIGS. 3 and 4, for example, is perpendicular to and radially offset from (with respect to the axis 24) the axis 24. The rocker first arm 136 projects longitudinally along a centerline 144 of the rocker first arm 136 (e.g., radially relative to the rocker axis 142) out from the rocker base 134 to a longitudinal distal end of the rocker first arm 136. This first arm centerline 144 may be a straight line centerline when viewed, for example, in the reference plane. The rocker second arm 138 projects longitudinally along a centerline 146 of the rocker second arm 138 (e.g., radially relative to the rocker axis 142) out from the rocker base 134 to a longitudinal distal end of the rocker second arm 138. This second arm centerline 146 may be a straight line centerline when viewed, for example, in the reference plane. The second arm centerline 146 of FIGS. 3 and 4 is angularly offset from the first arm centerline 144 by an included offset angle 148. This offset angle 148 may be an obtuse angle between, for example, one hundred and twenty degrees (120°) and one hundred and eighty degrees (180°); e.g., about one hundred and fifty or sixty degrees (150°, 160°). In addition, a longitudinal length of the rocker second arm 138 is less than a longitudinal length of the rocker first arm 136. The first arm length, for example, may be equal to or greater than three times (3×), five times (5×) or seven times (7×) the second arm length. The present disclosure, however, is not limited to the foregoing exemplary arrangement. The offset angle 148 and/or the arms lengths may vary depending on a distance between the rocker axis 142 and the airflow splitter 88 and/or a size of the airflow splitter 88.

The rocker first arm 136 is operatively coupled to the airflow splitter 88. The rocker first arm 136 of FIGS. 3 and 4, for example, projects into a respective receptacle 150 of the airflow splitter 88 at a backside of the leading edge 98. The rocker first arm 136 may thereby laterally engage (e.g., contact) the airflow splitter 88 at the first arm distal end.

The first cam 126 may be configured as a double lobe cam and/or a double nose cam. The first cam 126 of FIGS. 3 and 4, for example, includes a first cam base 152, a first cam rocker lobe 154 and a first cam nut lobe 156. The first cam base 152 is pivotally coupled to the assembly mount 140 and is configured to pivot (e.g., rock back and forth) about a first cam axis 158; e.g., a pivot axis of the first cam 126. This first cam axis 158 may be parallel with the rocker axis 142. The first cam rocker lobe 154 projects radially out from the first cam base 152 and has a tapered geometry. This first cam rocker lobe 154 engages (e.g., contacts) the rocker first arm 136. The first cam rocker lobe 154 of FIGS. 3 and 4, for example, is adjacent and contacts a first lobe nose 159 of the rocker arm 124 and its rocker base 134. The first cam nut lobe 156 projects radially out from the first cam base 152 and has a tapered geometry. A centerline of the first cam rocker lobe 154 and a centerline of the first cam nut lobe 156 are circumferentially spaced about the first cam base 152 by an inter-lobe offset angle 160. This inter-lobe offset angle 160 may be between seventy degrees (70°) and one hundred and ten degrees (110°); e.g., about ninety degrees (90°). Here, the first cam rocker lobe 154 and the first cam nut lobe 156 may share a common (the same) longitudinal length. The present disclosure, however, is not limited to the foregoing exemplary arrangement.

The second cam 128 may be configured as a double lobe cam and/or a double nose cam. The second cam 128 of FIGS. 3 and 4, for example, includes a second cam base 162, a second cam rocker lobe 164 and a second cam nut lobe 166. The second cam base 162 is pivotally coupled to the assembly mount 140 and is configured to pivot (e.g., rock back and forth) about a second cam axis 168; e.g., a pivot axis of the second cam 128. This second cam axis 168 may be parallel with the rocker axis 142. The second cam rocker lobe 164 projects radially out from the second cam base 162 and has a tapered geometry. This second cam rocker lobe 164 engages (e.g., contacts) the rocker second arm 138. The second cam rocker lobe 164 of FIGS. 3 and 4, for example, is adjacent and contacts a second lobe nose 169 of the rocker arm 124 and its rocker base 134. The second cam nut lobe 166 projects radially out from the second cam base 162 and has a tapered geometry. A centerline of the second cam rocker lobe 164 and a centerline of the second cam nut lobe 166 are circumferentially spaced about the second cam base 162 by an inter-lobe offset angle 170. This inter-lobe offset angle 170 may be between twenty-five degrees (25°) and sixty-five degrees (65°); e.g., about forty-five degrees (45°). Here, the second cam rocker lobe 164 and the second cam nut lobe 166 may share a common (the same) longitudinal length. The present disclosure, however, is not limited to the foregoing exemplary arrangement.

The leadscrew nut 132 is threaded onto the leadscrew 130. This leadscrew nut 132 is arranged in a track or otherwise configured with a guide (not visible in the view of FIGS. 3 and 4) such that leadscrew nut 132 is moveable longitudinally along the leadscrew 130, but is not rotatable with the leadscrew 130. The leadscrew nut 132 is thereby configured to translate rotational movement of the leadscrew 130 into translation longitudinally along the leadscrew 130. The leadscrew nut 132 may be configured as a butterfly nut. The leadscrew nut 132 of FIGS. 3 and 4, for example, includes two grooves. Each of these grooves receives a respective one of the nut lobes 156 and 166. The leadscrew nut 132 is thereby operatively coupled to the first cam 126 and the second cam 128, where the longitudinal translation of the leadscrew nut 132 along the leadscrew 130 pivots the first cam 126 about its first cam axis 158 as well as pivots the second cam 128 about its second cam axis 168.

The actuator 122 is operatively coupled to the leadscrew 130. This operative coupling may be a direct coupling between the actuator 122 and the leadscrew 130. Alternatively, the actuator 122 may be indirectly coupled to the leadscrew 130 through an intermediate linkage or an intermediate linkage assembly. During operation, the actuator 122 is configured to selectively rotate the leadscrew 130 in a first direction or a second direction. When the leadscrew 130 is rotated in the first direction, the leadscrew nut 132 moves towards the rocker arm 124. This movement of the leadscrew nut 132 pivots the first cam 126 counterclockwise about its first cam axis 158 and pivots the second cam 128 clockwise about its second cam axis 168. This movement of the first cam 126 and the second cam 128 pivots the rocker arm 124 counterclockwise about its rocker axis 142. The first direction rotation of the leadscrew 130 may thereby facilitate movement of the leading edge 98 radially inwards towards the axis 24 from the arrangement of FIG. 3 to the arrangement of FIG. 4. By contrast, when the leadscrew 130 is rotated in the second direction, the leadscrew nut 132 moves away from the rocker arm 124. This movement of the leadscrew nut 132 pivots the first cam 126 clockwise about its first cam axis 158 and pivots the second cam 128 counterclockwise about its second cam axis 168. This movement of the first cam 126 and the second cam 128 pivots the rocker arm 124 clockwise about its rocker axis 142. The second direction rotation of the leadscrew 130 may thereby facilitate movement of the leading edge 98 radially outwards away from the axis 24 from the arrangement of FIG. 4 to the arrangement of FIG. 3.

Referring to FIG. 2, a ratio of the airflow flowing out of the propulsor flowpath 66 into the core flowpath 70 and the bypass flowpath 74 is related to, inter alia, a radial location of the leading edge 98. In a typical gas turbine engine, a radial location of a leading edge is fixed and is selected to provide a compromise in engine performance between various engine operating modes; e.g., part throttle, full throttle, etc. By contrast, the airflow splitter 88 of FIGS. 3 and 4 is configured to deform to facilitate changing the radial location of its leading edge 98. The actuation system 118 may thereby be controlled to facilitate an optimized radial location of the leading edge 98 based on, for example, an operating mode in which the turbine engine 22 is operating and/or one or more other operational parameters.

In some embodiments, referring to FIGS. 3 and 4, the turbine engine 22 may include a variable vane array 172 in the core flowpath 70 at or near the core inlet 68. This vane array 172 includes a plurality of variable vanes 174; e.g., pivoting inlet guide vanes. These variable vanes 174 are arranged circumferentially about the axis 24 in an annular array; e.g., a circular array. Each of the variable vanes 174 extends spanwise (e.g., generally radially relative to the axis 24) across the core flowpath 70 from a radial inner flowpath wall 175 of the core flowpath 70 (see FIG. 2) to the inner wall structure 84 (e.g., the outer flowpath wall 92 of the core flowpath 70). Each of the variable vanes 174 may also be pivotally coupled to the inner flowpath wall 175 (see FIG. 2) and the inner wall structure 84. Each of the variable vanes 174 may thereby pivot about a respective vane axis 176. The pivoting of the variable vanes 174 may be timed (e.g., synchronized) with the deformation of the airflow splitter 88 and the radial movement of its leading edge 98. Each of the variable vanes 174, for example, may also be operatively coupled to the actuator 122 such that this single actuator 122 may induce the pivoting of the variable vanes 174 as well as the movement of the leading edge 98. Thus, the movement of the leading edge 98 may be mechanically linked to the pivoting of the variable vanes 174. Alternatively, it is contemplated the variable vanes 174 may be actuated by a different actuator than the actuator 122 for the airflow splitter 88. Here, the multiple actuators may be controlled to provide the timed (e.g., synchronized) operation.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   an inner wall structure extending axially along a first axis to an inner wall upstream end, the inner wall structure extending circumferentially about the first axis, and the inner wall structure forming an outer peripheral boundary of an inner flowpath;

an outer wall structure extending axially along the first axis to an outer wall upstream end, the outer wall structure extending circumferentially about the inner wall structure and the first axis, and the outer wall structure forming an inner peripheral boundary of an outer flowpath;

a splitter extending axially along the first axis to a leading edge, an inner section of the splitter connected to the inner wall structure at the inner wall upstream end, an outer section of the splitter connected to the outer wall structure at the outer wall upstream end and meeting the inner section of the splitter at the leading edge, and the splitter comprising a deformable material;

an actuation system mechanically coupled to the splitter and configured to move the leading edge radially relative to the first axis; and a variable vane extending across the inner flowpath, the variable vane configured to pivot about a vane axis;

the actuation system mechanically coupled to the variable vane and configured to pivot the variable vane about the vane axis.

2. The assembly of claim 1, wherein the deformable material forms the inner section of the splitter and the outer section of the splitter.

3. The assembly of claim 1, wherein the deformable material comprises a polymer matrix.

4. The assembly of claim 3, wherein the deformable material further comprises fiber reinforcement embedded within the polymer matrix.

5. The assembly of claim 1, wherein movement of the leading edge radially relative to the first axis is mechanically linked with pivoting of the variable vane about the vane axis.

6. The assembly of claim 1, wherein movement of the leading edge radially relative to the first axis is timed with pivoting of the variable vane about the vane axis.

7. The assembly of claim 1, further comprising:
a bladed rotor rotatable about the first axis;
the splitter axially next to and downstream of the bladed rotor.

8. The assembly of claim 7, wherein
the bladed rotor comprises a fan rotor;
the inner flowpath comprises a core flowpath; and
the outer flowpath comprises a bypass flowpath.

9. The assembly of claim 7, further comprising:
an engine core configured to drive rotation of the bladed rotor about the first axis, the engine core including a compressor section, a combustor section and a turbine section;
the inner flowpath extending away from the splitter and through the compressor section, the combustor section and the turbine section; and
the outer flowpath extending away from the splitter and disposed outside of the engine core.

10. An assembly for an aircraft propulsion system, comprising:
an inner wall structure extending axially along a first axis to an inner wall upstream end, the inner wall structure extending circumferentially about the first axis, and the inner wall structure forming an outer peripheral boundary of an inner flowpath;
an outer wall structure extending axially along the first axis to an outer wall upstream end, the outer wall structure extending circumferentially about the inner wall structure and the first axis, and the outer wall structure forming an inner peripheral boundary of an outer flowpath;

a splitter extending axially along the first axis to a leading edge, an inner section of the splitter connected to the inner wall structure at the inner wall upstream end, an outer section of the splitter connected to the outer wall structure at the outer wall upstream end and meeting the inner section of the splitter at the leading edge, and the splitter comprising a deformable material; an actuation system mechanically coupled to the splitter and configured to move the leading edge radially relative to the first axis;

wherein the actuation system comprises a rocker arm, and the rocker arm includes a base, a first arm and a second arm;

wherein the base is between the first arm and the second arm and is configured to pivot about a rocker axis; and wherein the first arm projects longitudinally out from the base towards the leading edge, and the first arm is operatively coupled to the splitter.

11. The assembly of claim 10, wherein
the splitter includes a receptacle at a backside of the leading edge; and
the first arm projects longitudinally into the receptacle.

12. The assembly of claim 10, wherein
the first arm projects longitudinally out from the base towards the leading edge to a distal end of the first arm; and
the first arm engages the splitter at the distal end of the first arm.

13. The assembly of claim 10, wherein the rocker axis is perpendicular to and radially offset from the first axis.

14. The assembly of claim 10, wherein the rocker axis is non-coincident with and is angularly offset from the first axis.

15. The assembly of claim 10, wherein
the actuation system further comprises a first cam and a second cam;
the first cam is engaged with the first arm and is configured to pivot the rocker arm a first direction about the rocker axis; and
the second cam is engaged with the second arm and is configured to pivot the rocker arm a second direction about the rocker axis.

16. The assembly of claim 15, wherein
pivoting of the rocker arm in the first direction about the rocker axis moves the leading edge radially away from the first axis; and
pivoting of the rocker arm in the second direction about the rocker axis moves the leading edge radially towards the first axis.

17. The assembly of claim 15, wherein
the actuation system further comprises a nut and a leadscrew; and
the nut is threaded onto the leadscrew and is operatively coupled to the first cam and the second cam.

18. An assembly for an aircraft propulsion system, comprising:
an inner wall structure extending axially along a first axis to an inner wall upstream end, the inner wall structure extending circumferentially around the first axis, and the inner wall structure forming an outer peripheral boundary of an inner flowpath;
an outer wall structure extending axially along the first axis to an outer wall upstream end, the outer wall structure extending circumferentially around the inner wall structure, and the outer wall structure forming an inner peripheral boundary of an outer flowpath;

a splitter connected to the inner wall structure at the inner wall upstream end, the splitter connected to the outer wall structure at the outer wall upstream end, the splitter projecting axially along the first axis to a leading edge, and the splitter comprising a deformable material; and an actuation system comprising a rocker arm operatively coupled to the splitter, the actuation system configured to move the leading edge radially relative to the first axis by pivoting the rocker arm about a rocker axis.

* * * * *